July 10, 1923.
A. E. GUERTIN
SHOCK ABSORBER
Filed April 18, 1922
1,461,391
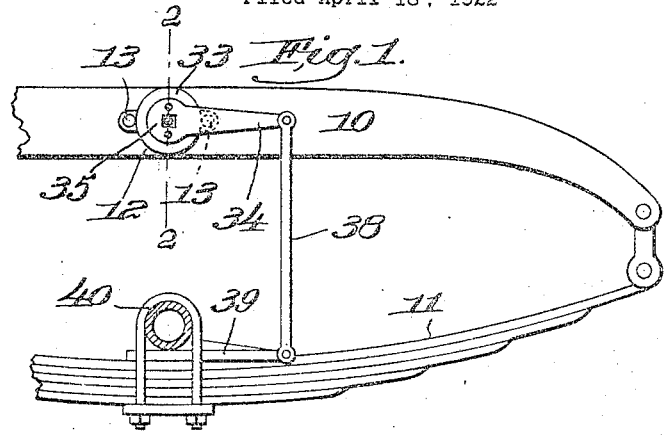
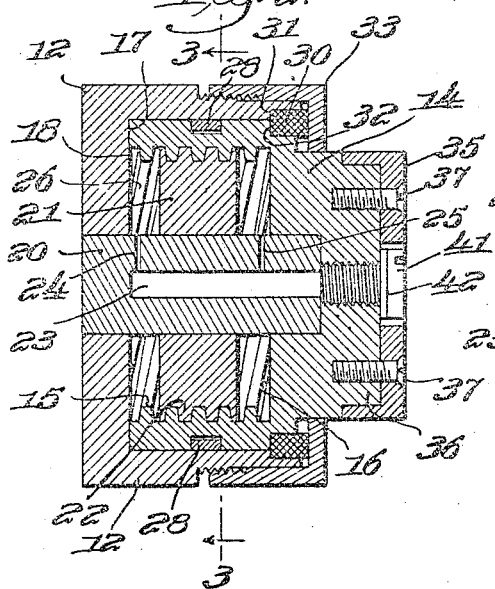
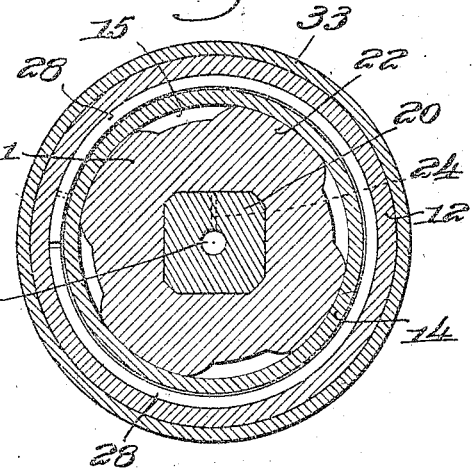
Inventor;
Augustus E. Guertin,
by Edward F. Allen.
his Atty.

Patented July 10, 1923.

1,461,391

UNITED STATES PATENT OFFICE.

AUGUSTUS E. GUERTIN, OF BELMONT, MASSACHUSETTS.

SHOCK ABSORBER.

Application filed April 18, 1922. Serial No. 554,833.

*To all whom it may concern:*

Be it known that I, AUGUSTUS E. GUERTIN, a citizen of the United States of America, and a resident of Belmont, in the county of Middlesex and Commonwealth of Massachusetts, have invented certain new and useful Improvements in Shock Absorbers, of which the following is a specification.

This invention relates to shock absorbers, and particularly to a device of this class that is applicable to existing motor driven vehicles such as automobiles, trucks, tc.

An object of the invention is to produce a device of this class that is simple and durable in structure and consequently cheap to manufacture.

A further object of the invention being to produce a shock absorber of unquestioned efficiency that may be applied to existing vehicles and which does not require costly and troublesome rearrangement or additions to the vehicle in order to apply it thereto.

As the present device includes the use of liquids, it is an object of the invention to so construct it that the loss of efficiency and uniform action by leakage is eliminated by simple but effective means.

The invention further consists in certain novel features of construction and arrangement of parts which will be fully understood from a description of the drawings and the claims hereinafter given.

Of the drawings:

Figure 1 represents a sufficient portion of a vehicle chassis and spring to enable the invention to be understood.

Figure 2 a section on an enlarged scale on the line 2—2 Figure 1.

Figure 3 a section on the line 3—3 Figure 2.

Like characters designate like parts throughout the several figures of the drawing.

Referring to the drawings:

The drawings herewith show one form of the invention for the purpose of explanation but it will be understood that various changes might be made in the construction and arrangement thereof without departing from its spirit and scope.

As is common in vehicles, especially motor driven vehicles, the chassis 10 is suitably yieldingly supported on springs 11, a portion of one of which is shown, said springs being in turn secured in one way or another to the axles of the vehicle. In the present instance a cylindrical shell 12 is secured to the chassis 10 by means of bolts 13 and has revolubly mounted therein a plug-like member 14 hollowed in such manner as to be internally threaded as at 15 and to present a wall 16. The said member 14 being made to have a close running fit in the shell 12, the edge 17 thereof bearing against the wall 18.

A stud 20 centrally disposed in said shell is fast therewith, its ends, see Figure 2, being preferably cylindrical, the left end being tightly driven into the shell 12 and the joint brazed or otherwise made tight. The right end projecting into the revoluble plug 14 which forms a bearing therefor. Between the walls 16 and 18 the stud 20 is preferably square sided to slidingly receive thereon a disk-like partition 21, the periphery of which is threaded as at 22 and adapted to engage the internal threads 15 of the plug 14. The said stud being bored centrally as at 23 to form a by pass chamber which has openings 24 and 25 leading into the chambers 26 and 27 respectively at each side of the partition 21. These chambers are adapted to be filled with a liquid such as oil, glycerine or the like, and it is essential that it shall be retained therein and leakage prevented to obtain the most efficient and uniform results.

As before stated, the plug 14 has a nice running fit with the shell 12 which aids in retaining the liquid in the chamber, and the plug is also provided with an expansion ring 28 of any usual or well known make which also forms an effective barrier for the passage of liquid. As a third preventative a packing ring or gland 30 is provided which enters the shell and bears against a shoulder 31 thereof and a shoulder 32 formed on the plug 14. The packing ring 30 and consequently the plug 14 are held in snug operative position by means of the adjustable cap 33 which is internally threaded to engage threads on the exterior of shell 12.

The lever 34 has a cup-like head 35 adapted to fit over a hub like projection 36 of the plug 14 to which it is firmly secured by the screws 37.

At its other end the said lever is pivoted to a link 38 in turn pivoted to a stationary arm 39 which is herein shown as secured by the spring clips but may be secured in any suitable manner.

From the foregoing it will be readily seen that relative movement between the chassis 10 and the axle 40 will cause a rocking movement of the lever 34 which transmits its movement to the plug 14. The threads of the plug being of coarse pitch, suitable for the occasion, causes the threaded partition 21 to travel longitudinally of the stud 20 in one direction or the other forcing the liquid from one chamber 26 to the other or vice versa by way of the by pass formed in the stud 20, and in so doing receives the shock of sudden and violent relative movement between the said chassis and said axle.

For the purpose of filling the liquid chambers a hole is tapped in the plug 14 to receive a screw 41 which may be removed to enable a squirt gun to enter the chamber 23, said screw being provided with a washer 42 to aid in sealing said hole against leakage therefrom.

While the invention has been herein shown and described in connection with vehicles, it is obvious that it might be equally valuable for other purposes such, for instance, as a door check, and therefore it is not the intention to restrict it to the precise construction and arrangement herein shown as the same might be changed in some minor detail without departing from its spirit and scope.

Having described the invention I claim:

1. In a shock absorber of the class described, a stationary receptacle having a stud fast therewith; a revoluble member, the main body of which is enclosed in said receptacle, said member having an internally threaded bore; a travelling partition slidably mounted on said stud in said bore, having threads on the periphery thereof adapted to engage said internally threaded bore; a chamber on each side of said partition; a by pass in said stud adapted to communicate with said chambers; means to fill said chambers; a lever fast with said revoluble member; a link pivoted to said lever at one of its ends; and an anchor member to which the other end of said link is pivoted.

2. In a shock absorber of the class described, the combination of a vehicle chassis; an axle; a vehicle spring fast with said axle; of a shell fast with said chassis; a stud centrally disposed in said shell and fast therewith; a revoluble plug in said shell protruding outwardly therefrom, said plug having an internally threaded bore; means to retain said plug in operative position in said shell; a non-revoluble partition slidably mounted on said stud having threads on the periphery thereof adapted to engage the threads of said bore; a chamber adapted to contain liquid each side of said partition; a by pass in said stud communicating with said chambers; means coacting with said shell and said plug to prevent the escape of said liquid; and means to rock said plug upon relative movement of said chassis and axle.

3. In a shock absorber of the class described, the combination of a vehicle chassis; an axle; a vehicle spring fast with said axle; of a shell fast with said chassis; a squared stud centrally disposed in and fast with said shell; a revoluble plug in said shell protruding outwardly therefrom, said plug having a threaded bore forming a chamber adapted to contain liquid; an expansion ring surrounding said plug coacting with the inner wall of said shell adapted to prevent leakage of liquid from said chamber; means to retain said plug in said shell, said means including a packing gland and an adjustable ring; a slidable partition mounted on said squared stud in said chamber adapted to divide said chamber into two compartments; a by pass in said stud communicating with said compartments; a lever fast with said plug; a stationary arm; a link intermediate said lever and said arm whereby relative movement of said chassis and said axle will cause said plug to rock and force said liquid from one compartment to the other; and means to supply liquid to said compartments.

Signed by me at Boston, Mass., this 10th day of April, 1922.

AUGUSTUS E. GUERTIN.